US010983069B2

(12) United States Patent
Blödt et al.

(10) Patent No.: US 10,983,069 B2
(45) Date of Patent: Apr. 20, 2021

(54) MEASURING DEVICE FOR DIELECTRIC CONSTANT DETERMINATION

(71) Applicant: Endress+Hauser SE+Co. KG, Maulburg (DE)

(72) Inventors: Thomas Blödt, Steinen (DE); Tobias Brengartner, Emmendingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 168 days.

(21) Appl. No.: 16/223,628

(22) Filed: Dec. 18, 2018

(65) Prior Publication Data

US 2019/0187071 A1 Jun. 20, 2019

(30) Foreign Application Priority Data

Dec. 20, 2017 (DE) ...................... 10 2017 130 728.1

(51) Int. Cl.
*G01N 22/00* (2006.01)
(52) U.S. Cl.
CPC .................................... *G01N 22/00* (2013.01)
(58) Field of Classification Search
CPC ........ G01N 22/00; G01N 27/221; G01N 3/00; G01N 3/317; G01N 3/38; G01N 2223/101; G01F 23/26; G01F 23/284
See application file for complete search history.

(56) References Cited

U.S. PATENT DOCUMENTS

| 4,568,890 A * | 2/1986 | Bates ...................... H03B 9/146 |
| | | 331/107 C |
| 6,163,158 A * | 12/2000 | Moeller ............... A24C 5/3412 |
| | | 324/633 |
| 2005/0253595 A1* | 11/2005 | France ................... G01N 22/04 |
| | | 324/639 |
| 2011/0267074 A1* | 11/2011 | Xie ........................ G01N 33/28 |
| | | 324/629 |

FOREIGN PATENT DOCUMENTS

| DE | 3213335 A1 | 10/1983 |
| DE | 69729117 T2 | 5/2005 |
| DE | 19915017 B4 | 9/2006 |
| DE | 102012104075 A1 | 11/2013 |
| DE | 102012105281 A1 | 12/2013 |
| DE | 102013225306 A1 | 6/2015 |

\* cited by examiner

*Primary Examiner* — Son T Le
(74) *Attorney, Agent, or Firm* — Mark A. Logan; Endress+Hauser (USA) Holding Inc.

(57) ABSTRACT

The present disclosure relates to a measuring device for measuring a dielectric constant of fill substances in containers. The measuring device includes: a transmitting circuit for transmitting a first electromagnetic high-frequency signal and a second electromagnetic high-frequency signal; a receiving circuit for receiving the two high-frequency signals; and an evaluation circuit to ascertain a first phase shift between the transmitting and the receiving of the first high-frequency signal, to ascertain a second phase shift between the transmitting and the receiving of the second high-frequency signal, and to ascertain an amplitude of one (Continued)

of the received high-frequency signals. Based on these three values, the dielectric constant is determined. By determining phase shift at different frequencies, it is possible according to the present disclosure, especially in the case of solid-type fill substances, to determine their dielectric constant uncorrupted, thus without influence of air inclusions or moisture.

18 Claims, 4 Drawing Sheets

MEASURING DEVICE FOR DIELECTRIC CONSTANT DETERMINATION

CROSS-REFERENCE TO RELATED APPLICATION

The present application is related to and claims the priority benefit of German Patent Application No. 10 2017 130 728.1, filed on Dec. 20, 2017, the entire contents of which are incorporated herein by reference.

TECHNICAL FIELD

The present disclosure relates to a measuring device and to a method for measuring a dielectric constant (DK) of a fill substance located in a container.

BACKGROUND

In automation technology, such as, for example, in large industrial process plants, measuring devices are often applied, which serve for registering process parameters of process media. The registering of the process parameters is based on measuring principles suitable therefor. Corresponding sensors are applied in, among others, fill-level measuring devices, flow measuring devices, pressure- and temperature measuring devices, pH-redox potential measuring devices, conductivity measuring devices, etc. They register the corresponding process parameters, such as fill level, flow, pressure, temperature, pH-value, redox potential, conductivity and dielectric constant, in the containers or tubes, in which the process medium is located. A large number of these measuring devices are manufactured and sold by the firm, Endress+Hauser.

The determining of dielectric constant (also known as "relative permittivity") is of great interest both in the case of solids, as well as also in the case of liquid fill substances, such as, for example, fuels, waste waters or chemicals, since this value can serve as a reliable indicator of impurities therein. For determining the dielectric constant, the prior art provides, above all in the case of liquid fill substances, the capacitive measuring principle. In such case, the effect is utilized that the capacitance of a capacitor is proportional to the dielectric constant of the medium located between the two electrodes of a capacitor.

Alternatively, it is also possible to determine the dielectric constant of a (liquid) medium in a container interior, in a way, parasitically, in conjunction with its fill level measurement. This requires the measuring principle of guided radar, in the case of which microwaves are guided via an electrically conductive waveguide in the medium. This combined fill level- and dielectric measuring is described in disclosure document DE 10 2015 117 205 A1.

This combining of measuring principles is, however, burdened with the disadvantage that the measuring of the dielectric constant can be corrupted in the case of solids. The reason is that, for example, air inclusions can be present in granular fill substances and moisture can be present in granular or powdered fill substances. In these cases, the state of the art determines an average value of the dielectric constant of the fill substance and the air, or water, as the case may be, even though the dielectric constant of the pure fill substance is really what is of interest.

SUMMARY

An object of the present disclosure, therefore, is to provide a measuring device and a method, which especially in the case of solid-type fill substances permits an improved measuring of the dielectric constant.

The present disclosure achieves this object by a measuring device for measuring a dielectric constant of a fill substance located in a container, comprising: a transmitting circuit, which is designed to transmit in the direction of the fill substance a first electromagnetic high-frequency signal with a first frequency and a second electromagnetic high-frequency signal with a second frequency, a receiving circuit, which is arranged and embodied to receive the first high-frequency signal and the second high-frequency signal, and an evaluation-circuit, which is designed to ascertain a first phase shift between the transmitting and the receiving of the first high-frequency signal, to ascertain a second phase shift between the transmitting and the receiving of the second high-frequency signal, to ascertain an amplitude of at least the received, first high-frequency signal, and, based on the amplitude, the first phase shift and the second phase shift, to determine the dielectric constant.

In such case, the terminology, "high frequency signal", refers within the scope of the present disclosure to electromagnetic waves in the range from short waves to microwaves (radar), thus from about 3 MHZ to 300 GHz. The present disclosure makes use, in such case, of the fact that the dielectric constant can be ascertained based on the relationship $$\frac{\left(\frac{c_0 * \Delta \varphi_1}{2\pi f_{HF1}}\right)^2 - 1}{DK - 1} = (1 - r) = \frac{\left(\frac{c_0 * \Delta \varphi_2}{2\pi f_{HF2}}\right)^2 - 1}{DK - 1}$$

($c_0$ is the propagation velocity of electromagnetic waves in vacuum). By determining the phase shift at different frequencies, it is, thus, possible, above all in the case of solid-type fill substances, to determine an uncorrupted dielectric constant.

Preferably, the frequencies of the first high-frequency signal and the second high-frequency signal lie between 10 MHz and 10 GHz. This has advantages as regards regulatory constraints. This region also represents a good compromise between sufficient transmission through the fill substance and effecting a sufficient phase shift. In order to design the measuring device redundantly, it is additionally advantageous to ascertain the amplitudes of both high-frequency signals (either separately or as a sum).

The high-frequency signals can be produced relatively easily by providing the transmitting circuit with a first oscillatory circuit, especially an oscillator, which is designed to produce the first high-frequency signal and/or the second high-frequency signal.

Especially advantageously, the first oscillatory circuit is designed to produce, especially simultaneously produce, both the first high-frequency signal as well as also the second high-frequency signal. In this way, a second oscillatory circuit is unnecessary. Such can be implemented, for example, using an oscillator, for example, a quartz oscillator, which besides the fundamental frequency is also excited in one or more harmonics, such that, besides the fundamental frequency, also one or more harmonics can be coupled out. Thus, the first oscillatory circuit is designed to produce the second high-frequency signal using a harmonic, especially the first harmonic of the first high-frequency signal.

By accepting a more comprehensive circuit construction, it is naturally also an option that the transmitting circuit include a second oscillatory circuit for producing the second high-frequency signal. Especially in this case, the transmitting circuit can be so implemented that it includes, besides the first transmitting antenna, a second transmitting antenna for transmitting the second high-frequency signal. When a second oscillatory circuit is not implemented, it is preferred that the transmitting circuit has only a first transmitting antenna for transmitting the first high-frequency signal and the second high-frequency signal.

Independently of the design of the transmitting circuit, it is possible either so to design the receiving circuit that it includes a first receiving antenna for receiving the first high-frequency signal and the second high-frequency signal, or that the receiving circuit includes besides the first receiving antenna a second receiving antenna for receiving the second high-frequency signal.

The design of the antennas depends essentially on the conditions of use, under which the measuring device of the present disclosure is applied. Thus, the first transmitting antenna, the second transmitting antenna, the first receiving antenna and/or the second receiving antenna can be designed as a rod antenna, a horn antenna or a planar antenna, especially a fractal antenna. A design as rod antenna(s) is, for example, an option, when the receiving circuit is arranged near to the transmitting circuit, so that a low directionality is required. Rod antennas can be designed mechanically stably, so that they also are not damaged under mechanical load from the fill substance. A design in the form of greatly focusing horn antenna(s), in contrast, is advantageous, for example, when the receiving circuit is more removed from the transmitting circuit, for example, oppositely lying on the inner surface of a container having a large inner diameter. A further advantage of horn antennas is the good side lobe suppression, whereby the measuring device is very robust in the face of external radiation, so that the radio permitting is simplified. Planar antennas can, in turn, be advantageously applied, when at the location of installation, in total, limited space conditions reign.

In another development of the measuring device of the present disclosure, it is, additionally, an option to design the transmitting circuit, such that the first high-frequency signal and/or the second high-frequency signal can be transmitted with amplitude modulation. To the extent that, for this, the receiving circuit is correspondingly embodied, in order to detect the amplitude modulation and to associate it with the corresponding high-frequency signal, the particular high-frequency signal can, in this way, be selected. Thus, it is possible for the purpose of determining the phase shift to perform the selection of the high-frequency signal not (only) based on frequency.

Analogously to the measuring device of the present disclosure, the object is achieved by a method for determining the dielectric constant of a fill substance located in a container utilizing the above described measuring device. Accordingly, the method includes at least method steps as follows:

transmitting the first electromagnetic high-frequency signal with a first frequency in the direction of the fill substance, transmitting the second electromagnetic high-frequency signal with a second frequency in the direction of the fill substance, receiving the first high-frequency signal after its having passed through the fill substance, receiving the second high-frequency signal after its having passed through the fill sub stance, ascertaining a first phase shift between the transmitting and the receiving of the first high-frequency signal, ascertaining a second phase shift between the transmitting and the receiving of the second high-frequency signal, ascertaining an amplitude of at least the received, first high-frequency signal, and determining the dielectric constant based on the amplitude, the first phase shift and the second phase shift.

BRIEF DESCRIPTION OF THE DRAWINGS

The present disclosure will now be explained in greater detail based on the appended drawing, the figures of which show as follows.

DETAILED DESCRIPTION

Figure 1:
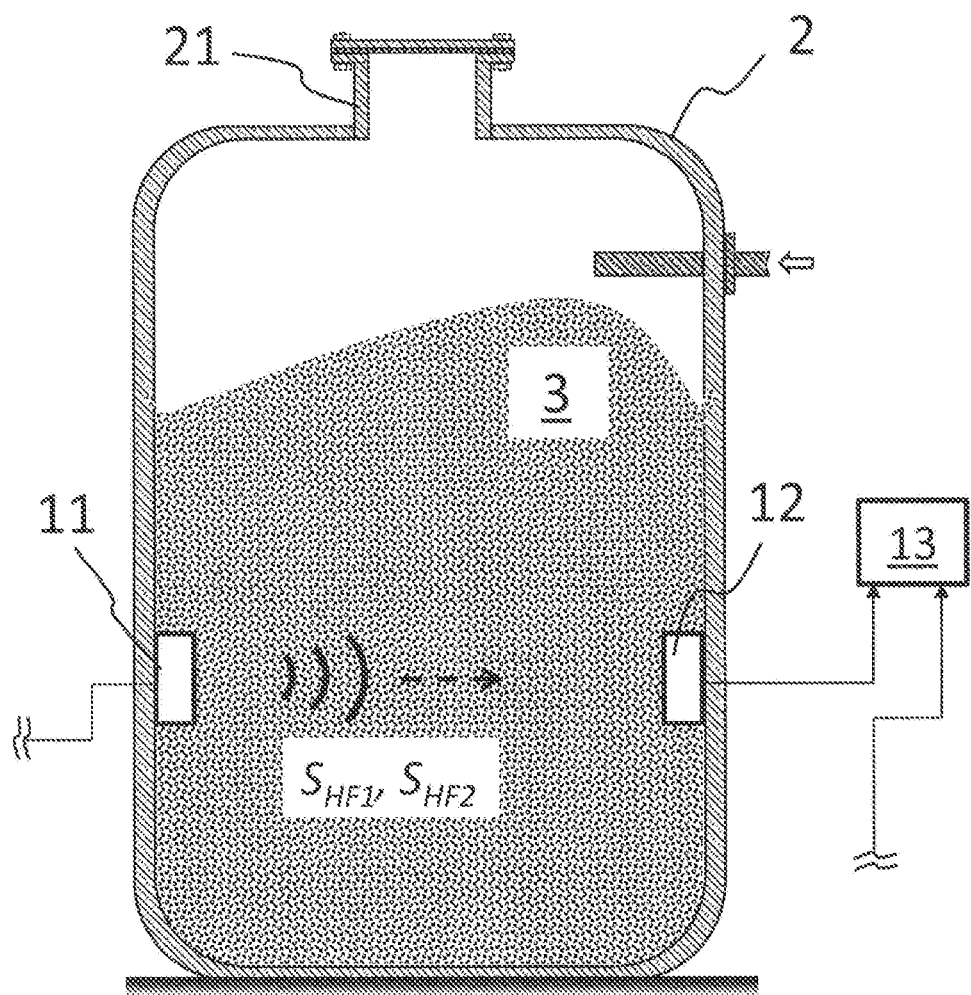
FIG. 1 shows a measuring device of the present disclosure mounted on a container.

FIG. 1 shows a measuring device 1 of the present disclosure, which for serves measuring a dielectric constant DK of a fill substance 3 located in a container 2. The measuring principle of measuring device 1 is based on producing at least two electromagnetic high-frequency signals $S_{HF1}$, $S_{HF2}$ with frequencies $f_{HF1}$, $f_{HF2}$ in the region between 3 MHZ and 300 GHz (thus in the region between short waves and microwaves), wherein the high-frequency signals $S_{HF1}$, $S_{HF2}$ have different frequencies $f_{HF1}$, $f_{HF2}$. The two high-frequency signals $S_{HF1}$, $S_{HF2}$ are transmitted through the fill substance 3. Fill substance 3 can be a liquid substance, such as kerosene, water etc. Along with that, it can, however, also be a solid-type fill substance 3, such as gravel, flour or the like. Exactly in the case of solid-type fill substances 3, it can due to porosity occur that a certain fraction $(1-r)$ of air (or the gas mixture above the fill substance 3) is entrained therein. Other solids, such as flour, can, however, also have a fraction $(1-r)$ of bound moisture.

After passage of the high-frequency signals $S_{HF1}$, $S_{HF2}$ through the fill substance 3, the resulting phase shifts $\Delta\varphi_1$, $\Delta\varphi_2$ of the two high-frequency signals $S_{HF1}$, $S_{HF2}$ are determined by an evaluating circuit 13. The influencing of the phase shifts $\Delta\varphi_1$, $\Delta\varphi_2$ by the dielectric constant DK of the fill substance 3 is given, in such case, by the formula $$\Delta\varphi_{1,2} = 2\pi f_{HF1,2} \frac{\sqrt{r(DK-1)+1}}{c_0}$$

Moreover, the amplitude A, or the attenuation of the amplitude A, is ascertained by the evaluation circuit 13 from at least one of the two signals $S_{HF1}$, $S_{HF2}$ after their passage through the fill substance 3. Based on $$\frac{\left(\frac{c_0 * \Delta\varphi_1}{2\pi f_{HF1}}\right)^2 - 1}{DK - 1} = (1-r) = \frac{\left(\frac{c_0 * \Delta\varphi_2}{2\pi f_{HF2}}\right)^2 - 1}{DK - 1}$$

the evaluation circuit 13 can, thus, ascertain the dielectric constant DK. The solution of this equation can generally be implemented numerically by a corresponding software of the evaluating circuit 13. To the extent that the first frequency $f_{HF1}$ of the first high-frequency signal $S_{HF1}$ is present at a certain ratio to the second frequency $f_{HF2}$ of the second high-frequency signal $S_{HF2}$, depending on the ratio, also an analytical solution of the above equation is possible. To the extent that the ratio of the frequencies $f_{HF1}$ amounts to 2:1, an analytical solution is present in the formula $$\frac{r*\Delta\varphi_2^2}{4*\Delta\varphi_1^2} - \frac{r}{\left(\frac{c_0*\Delta\varphi_1}{2\pi f}\right)^2} = \frac{(A-1)*DK*k}{DK*k-1}$$

(k, in such case, is a constant, which depends on the distance between the transmitting circuit 11 and the receiving circuit 12, as well as on absorption of the fill substance 3). According to the present disclosure, thus, the influence of the fraction r of air/moisture in the fill substance 3 is compensated by the effect that the phase shifts $\Delta\varphi_1$, $\Delta\varphi_2$ depend on the frequencies $f_{HF1}$, $f_{HF2}$ of the high-frequency signals $S_{HF1}$, $S_{HF2}$.

As shown in FIG. 1, the high-frequency signals $S_{HF1}$, $S_{HF2}$ are produced by a corresponding transmitting circuit 11 of the measuring device 1, which is arranged on the inner surface of the container 2, and transmitted in the direction of the fill substance 3. For receipt of the two high-frequency signals $S_{HF1}$, $S_{HF2}$ after passage through the fill substance 3, a receiving unit 12 is placed oppositely lying to the transmitting circuit 11 on the inner surface of the container 2. For determining the amplitude A, or the attenuation, and the phase shifts $\Delta\varphi_1$, $\Delta\varphi_2$, the transmitting circuit 11 and the receiving circuit 12 are correspondingly connected with the evaluation circuit 13.

In the case of the example of an embodiment shown in FIG. 1, the transmitting circuit 11 and the receiving circuit 12 are arranged, for instance, oppositely lying relative to one another on the inner surface of the container 3. This arrangement is especially advantageous in that the transmitting circuit 11 directly transmits the high-frequency signals $S_{HF1}$, $S_{HF2}$, so that the amplitudes of the high-frequency signals $S_{HF1}$, $S_{HF2}$ at the receiving circuit 12 are sufficiently high for detection. Using such an orientation, the transmitting circuit 11 and the receiving circuit 12 can, for example, also be positioned in a flange connection 21 of the container 2. Due to the comparatively short separation between the transmitting circuit 11 and the receiving circuit 12 in the case of the arrangement in the flange connection 21, there is the danger that the high-frequency signal $S_{HF1}$, $S_{HF2}$ are no longer detectable due to excessive attenuation.

In general, the arrangement, or orientation, of the transmitting circuit 11 and the receiving circuit 12 relative to one another is, however, not fixedly predetermined. Thus, the circuits 11, 12 could also be arranged next to one another on the (inner-) wall of the container 2, especially when the directionality of the transmitting circuit 11 and the receiving circuit 12 is small. Even an installation away from the container 2 is an option, to the extent that the container 2 is manufactured of a material that at the frequencies $f_{HF1}$, $f_{HF2}$ of the high-frequency signals $S_{HF1}$, $S_{HF2}$ is sufficiently transparent.

In principle, depending on the design, the transmitting circuit 11 and the receiving circuit 12 should correlate relative to one another as regards arrangement and orientation such that on the one hand, the distance between the transmitting circuit 11 and the receiving circuit 12 is sufficient, in order to be able at least to detect phase shifts $\Delta\varphi_1$, $\Delta\varphi_2$ (in the frequency range around 10 MHz, about 5 cm); and on the other hand, the distance and the frequencies $f_{HF1}$, $f_{HF2}$ should be small enough that the high-frequency signals $S_{HF1}$, $S_{HF2}$ are not completely absorbed by the fill substance 3.

Figure 2:
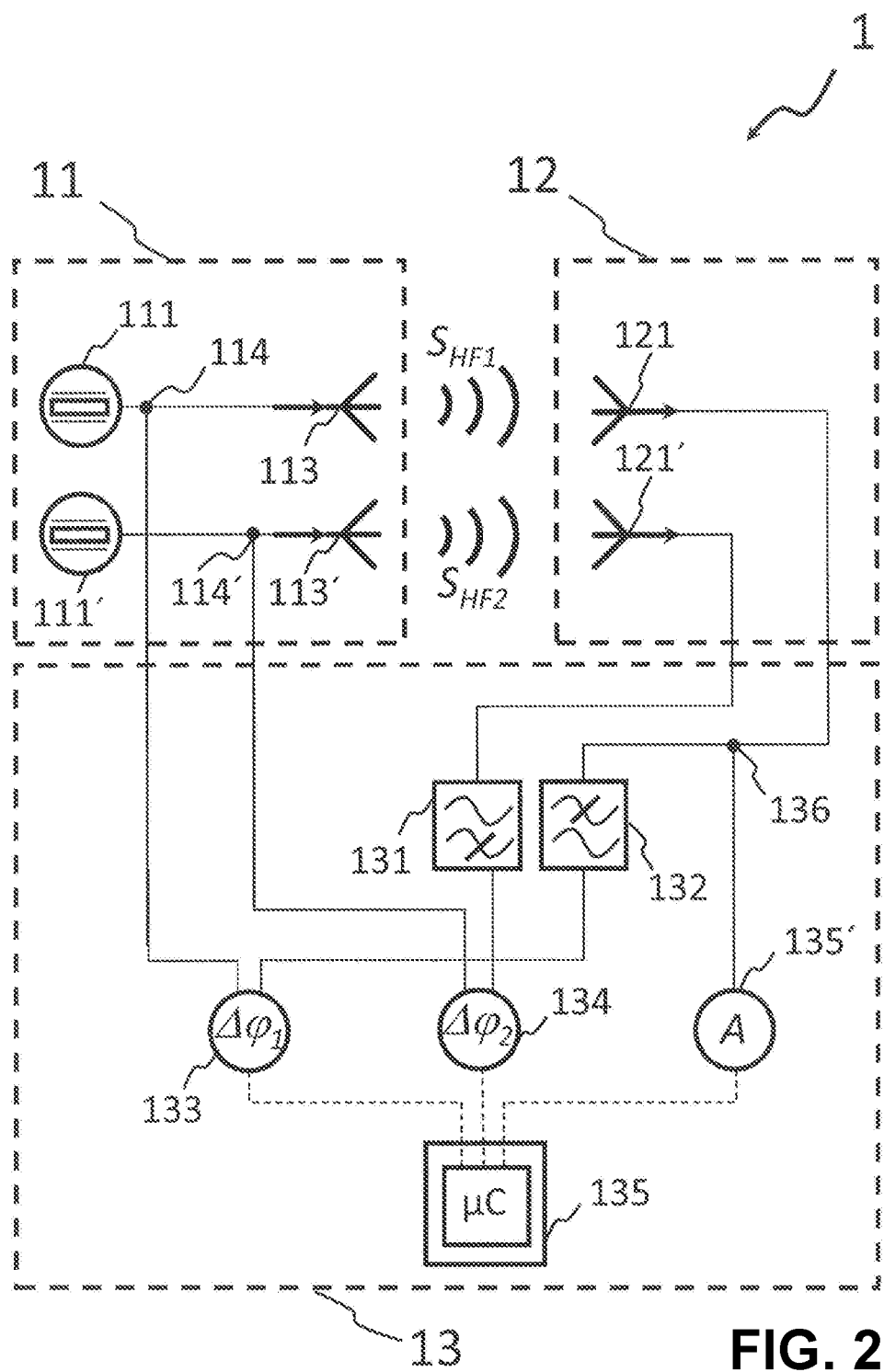
FIG. 2 shows a first design variant of the measuring device.

FIG. 2 shows a first design variant of the measuring device 1 of the present disclosure. The construction of the transmitting circuit 11 shown there is based on two transmitting antennas 113, 113', of which the first transmitting antenna 113 transmits the first high-frequency signal $S_{HF1}$ and the second transmitting antenna 113' transmits the second transmitting signal $S_{HF2}$. For this, the two transmitting antennas 113, 113' HF are operated by their own oscillatory circuits 111, 111'. In such case, the frequency $f_{HF1}$ of the first high-frequency signal $S_{HF1}$ is determined by the first HF oscillatory circuit 111. In an analogous manner, the second HF oscillatory circuit 111' defines the frequency $f_{HF2}$ of the second high-frequency signal $S_{HF2}$. The HF oscillatory circuits 111, 111' can be implemented, for example, in the form of VCOs ("voltage controlled oscillators") or as quartz oscillators.

Corresponding to the two transmitting antennas 113, 113' of the transmitting circuit 11, the receiving circuit 12 includes in the case of the embodiment shown in FIG. 2 two receiving antennas 121, 121'. In such case, the first receiving antenna 121 is designed to receive at least the first high-frequency signal $S_{HF1}$ after passage through the fill substance 3, and, analogously, the second receiving antenna 121' is designed to receive the second high-frequency signal $S_{HF2}$. In such case, the first receiving antenna 121 and the second receiving antenna 121' are preferably so designed that cross-influences of the first high-frequency signal $S_{HF1}$ on the second receiving antenna 121', and, conversely, are minimized.

In order, moreover, to filter out possible cross-influences of the first high-frequency signal $S_{HF1}$ on the second receiving antenna 121', a first highpass filter 131 is connected after the second receiving antenna. For suppressing possible cross-influences of the second high-frequency signal $S_{HF2}$ on the first receiving antenna 121, such is connected to a corresponding lowpass filter 132. In such case, the lowpass filter 132 suppresses the frequency $f_{HF2}$ of the second high-frequency signal $S_{HF2}$. Analogously thereto, the highpass filter 131 suppresses the higher frequency $f_{HF1}$ of the first high-frequency signal $S_{HF1}$. In the case of the embodiment of the measuring device 1 of the present disclosure shown in FIG. 2, the highpass filter 131 and the lowpass filter 132 are associated with the evaluation circuit 13. However, the highpass filter 131 and/or the lowpass filter 132 could also be designed as a component of the receiving circuit 12.

Besides minimizing the cross-sensitivity of the receiving antennas 121, 121', both the transmitting antennas 113, 113', as well as also the receiving antennas 121, 121', are, such as indicated in FIG. 1, to be designed taking into consideration the installed situation in the container 2. Accordingly, a design as rod antenna(s) is advantageous, for example, in the case of a close arrangement of the receiving circuit 12 to the transmitting circuit 11, where a low directionality is sufficient, and the antennas 113, 113',121, 121' must be mechanically stable. A design as strongly focusing horn antenna(s) is advantageous, in contrast, for example, when the receiving circuit 12 is arranged oppositely lying relative to the transmitting circuit 11, thus farther away on the inner surface of the container 2. Planar antennas can, in turn, be applied in the case of constrained space situations, for example, in the case of the integration of the receiving circuit 12 and the transmitting circuit 11 in the flange connection 21.

The phase shifts $\Delta\varphi_1$, $\Delta\varphi_2$ between transmitting and receipt of the high-frequency signals $S_{HF1}$, $S_{HF2}$ are ascertained in the evaluating circuit 13 by means of two phase comparators 133, 134 (also known under the terms "phase comparer" and "phase detector"). The first phase comparator 133 compares the first high-frequency signal $S_{HF1}$ received from the first receiving antenna 121, with interposed filtering by the first lowpass filter 132, with the transmitted, first high-frequency signal $S_{HF}$. For this, the first high-frequency signal $S_{HF1}$ is diverted in the transmitting circuit 11 between the first HF oscillatory circuit 111 and the transmitting antenna 113 by a first duplexer 114 and fed, same as the received, first high-frequency signal $S_{HF1}$, to the first phase comparator 133. Accordingly, the first phase comparator 133 ascertains the phase shift $\Delta\varphi_1$ of the first high-frequency signal $S_{HF1}$. In equal manner, the phase shift $\Delta\varphi_2$ of the second high-frequency signal $S_{HF2}$ is ascertained: a second phase comparator 134 compares the second high-frequency signal $S_{HF2}$ before transmission with the situation upon receipt by the second receiving antenna 121', and after filtering by the first highpass 131. For this, in turn, the second high-frequency signal $S_{HF2}$ is diverted in the transmitting circuit 11 between the second HF-oscillatory circuit 111' and the second transmitting antenna 113' by a second duplexer 114'. Instead of the two duplexers 114, 114', also corresponding power dividers, or power splitters, can be used.

Since according to the present disclosure supplementally to ascertaining the phase shifts $\Delta\varphi_1$, $\Delta\varphi_2$ also the attenuation of the amplitude An of at least one of the two high-frequency signals $S_{HF2}$, $S_{HF2}$ is to be determined, in the case of the embodiment of the measuring device 1 of the present disclosure shown in FIG. 2, the amplitude An of the received, first high-frequency signal $S_{HF1}$ is ascertained. For this, a directional coupler 136 diverts the high-frequency signal $S_{HF1}$ received from the first receiving antenna 121 before the lowpass filter 132 to a rectifier 135', for example, a bridge circuit of four diodes. The amplitude An of the rectified, first high-frequency signal $S_{HF1}$ can then be registered, for example, via an analog input of a microcontroller 135, or an equivalent circuit. Additionally, the outputs of the two phase comparators 133, 134 are connected to corresponding digital inputs of the microcontroller 135, so that, in this way, the phase shifts $\Delta\varphi_1$, $\Delta\varphi_2$ of the two high-frequency signals $S_{HF1}$, $S_{HF2}$ are transmitted to the microcontroller 135. Based on the relationship $$\frac{\left(\frac{c_0 * \Delta\varphi_1}{2\pi f_{HF1}}\right)^2 - 1}{DK - 1} = (1 - r) = \frac{\left(\frac{c_0 * \Delta\varphi_2}{2\pi f_{HF2}}\right)^2 - 1}{DK - 1}$$

the microcontroller 135 can thus calculate the cleaned dielectric constant DK of the fill substance 3 by means of a corresponding routine, or by means of a corresponding program.

In general, the first high-frequency signal $S_{HF1}$ and the second high-frequency signal $S_{HF2}$ must, indeed, be transmitted with constant frequencies $f_{HF1}$, $f_{HF2}$. As can be seen from the above formula, it is, per se, however, not required, that the first frequency Gin be in a certain ratio to second frequency $f_{HF2}$ is.

In the case of the embodiment shown in FIG. 2, it is, on the one hand, possible to transmit the first high-frequency signal $S_{HF1}$ simultaneously with the second high-frequency signal $S_{HF2}$. Alternatively, within the scope of the present disclosure, it is, however, also an option to use alternating transmissions, in order, for example, to save energy.

Figure 3:
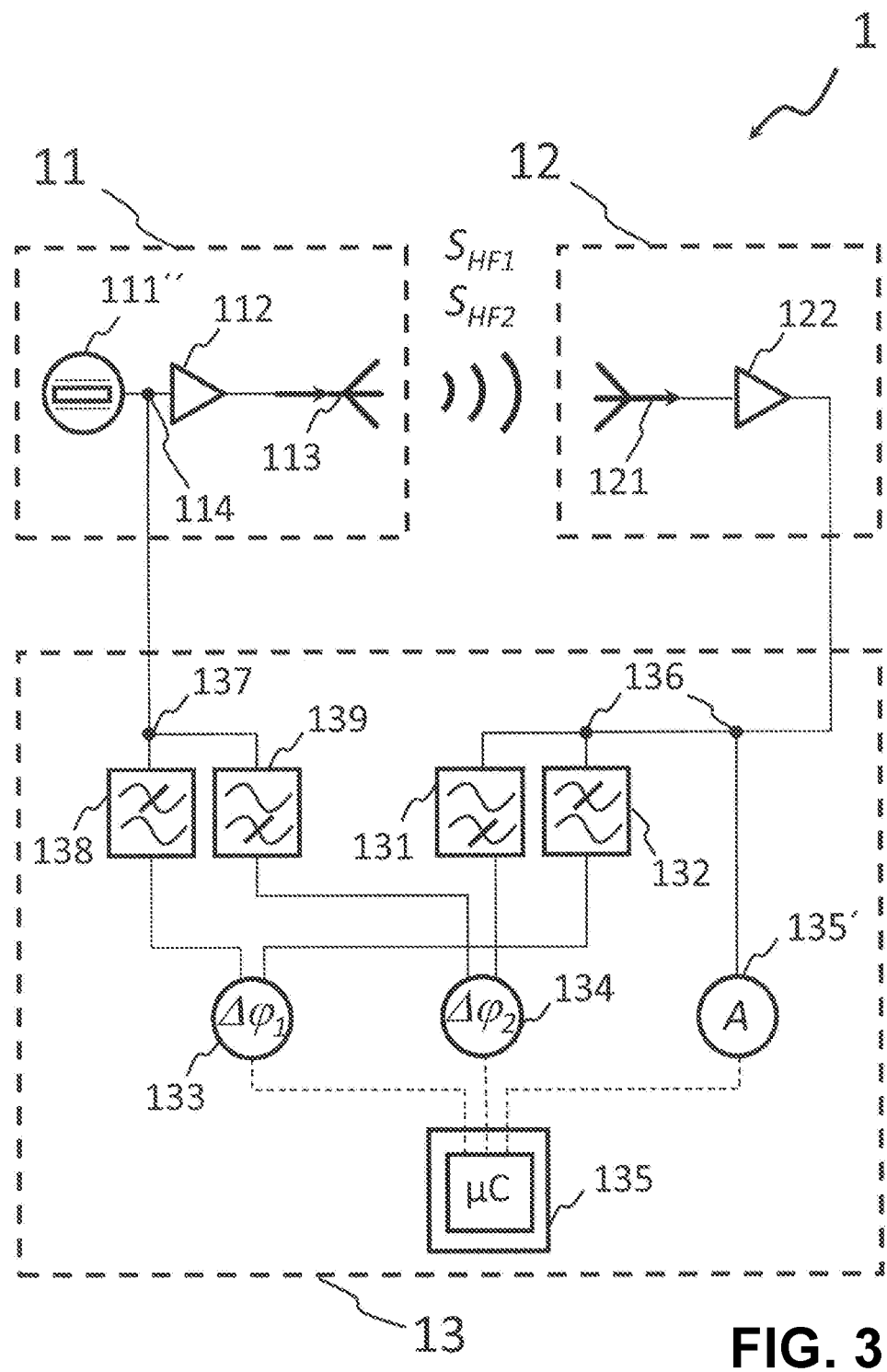
FIG. 3 shows a second design variant of the measuring device.

FIG. 3 represents a second embodiment of the measuring device 1 of the present disclosure, which requires a reduced number of components in comparison with the embodiment of FIG. 2: only the first transmitting antenna 113 is implemented in the transmitting circuit 11. Via it, both the first high-frequency signal $S_{HF1}$ as well as also the second high-frequency signal $S_{HF2}$ are transmitted. Moreover, the receiving circuit 12 in FIG. 3 has no second receiving antenna 121'. Accordingly, the first receiving antenna 121 is designed for the two frequencies $f_{HF1}$, $f_{HF2}$, so that the two high-frequency signals $S_{HF1}$, $S_{HF2}$ are receivable via it.

Also the production of the two high-frequency signals $S_{HF1}$, $S_{HF2}$ occurs in the case of the embodiment of FIG. 3 not separately by means of two HF oscillatory circuits 111, 111', but, instead, by means of only one harmonic wave oscillatory circuit 111", for example, in the form of a quartz oscillator. In such case, the effect is utilized that the harmonic wave oscillatory circuit produces besides a fundamental frequency $f_{HF1}$, additionally, at least one harmonic $f_{HF2}$. Thus, the fundamental frequency $f_{HF1}$ and the (first) harmonic $f_{HF2}$ form the basis for the two high-frequency signals $S_{HF1}$, $S_{HF2}$.

In contrast with the performance with only one harmonic wave oscillatory circuit 111", an option for the embodiment of FIG. 3 would be to produce the first high-frequency signal $S_{HF1}$ and the second high-frequency signal $S_{HF2}$ as in FIG. 2 separately by two HF oscillatory circuits 111, 111' and to supply the first transmitting antenna 113 via a coupler.

Since the receiving circuit 12 shown in FIG. 3 has only one receiving antenna 121, the directional coupler 136 diverts the high-frequency signals $S_{HF1}$, $S_{HF2}$ received from the receiving antenna 121 triply, and, indeed, to the first highpass 131, to the first lowpass filter 132 and to the rectifier 135'. In contrast with the embodiment of FIG. 2, the first highpass 131 and the first lowpass filter 132 are, thus, absolutely required. For that high-frequency signal $S_{HF1}$, $S_{HF2}$ received from the receiving antenna 121 not intended for the phase comparator 133, 134 (compare FIG. 2) must be appropriately filtered out. In this way, it is assured that the first lowpass filter 132 feeds only the received, first high-frequency signal $S_{HF1}$ to the first phase comparator 133, and that the first highpass 131 feeds only the received, second high-frequency signal $S_{HF2}$ to the second phase comparator 134.

Analogously thereto, also the high-frequency signals $S_{HF1}$, $S_{HF2}$ headed for transmission are correspondingly filtered for the two phase comparators 133, 134: Between the harmonic wave oscillatory circuit 111" and the first transmitting antenna 113, a sufficient power fraction of the high-frequency signals $S_{HF1}$, $S_{HF2}$ headed for transmission is diverted by means of the first duplexer 114 and further split via a third duplexer 137. The two diverted signal fractions are sent to a second lowpass filter 138 and a second highpass filter 139, before the signal portion sent through the second highpass 139 is fed to the second phase comparator 134; the signal portion sent through the second lowpass filter 138 is fed, same as the first high-frequency signal $S_{HF}$ coming from the first lowpass filter 132, to the first phase comparator 133. In this way, in turn, it is achieved that through the second lowpass filter 138 only the first transmitted high-frequency signal $S_{HF1}$ is fed to the first phase comparator 133, and that through the second highpass 139 only the second transmitted high-frequency signal $S_{HF2}$ is fed to the second phase comparator 134.

Since the high-frequency signals $S_{HF1}$, $S_{HF2}$ in the case of the embodiment shown in FIG. 3 are produced by a harmonic wave oscillatory circuit 111", the first lowpass filter 132 and second lowpass filter 138 are matched to the fundamental frequency $f_{HF1}$ of the harmonic wave oscillatory circuit 111". The first highpass 131 and the second highpass 139 are matched to the (first) harmonic $f_{HF2}$ of the harmonic wave oscillatory circuit 111".

Figure 4:
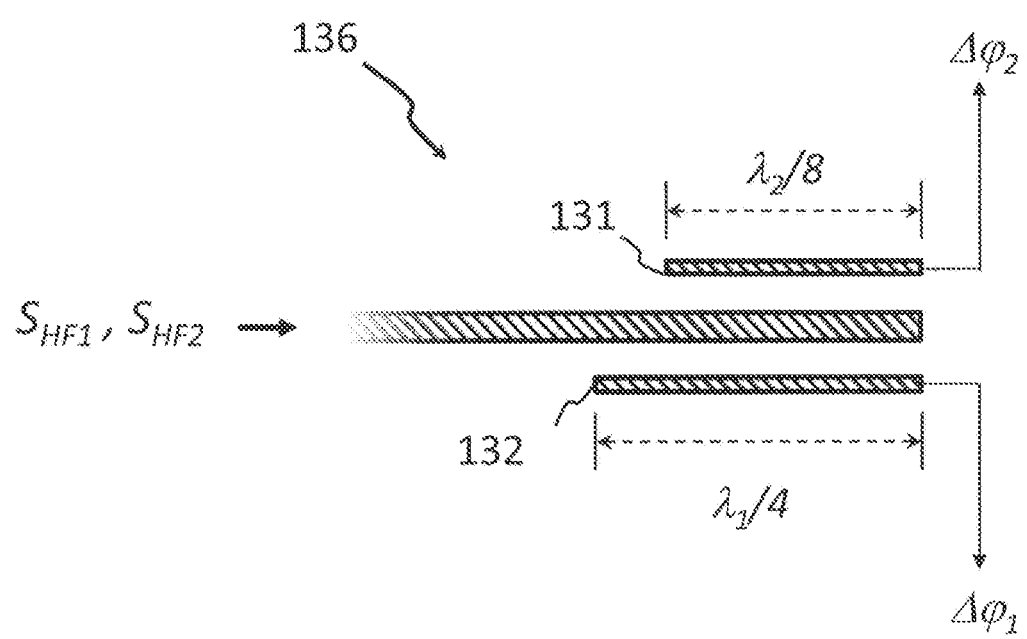
FIG. 4 shows a preferred form of embodiment of the directional coupler.

An opportunity for additional reduction of the effective number of components of the measuring device 1 of the present disclosure is shown in FIG. 4. The illustrated concept is based on the integration of the directional coupler 136, the first highpass 131 and the first lowpass filter 132 within a conductive trace structure. In such case, the principle of rod antennas is utilized, in the case of which the length of the antenna for sending an electromagnetic signal must be matched to the wavelength of the signal. Accordingly, the conductive trace structure shown in FIG. 4 includes three conductive traces extending in parallel with one another, of which a first outer conductive trace has a length of at least one eighth the wavelength $\lambda_2$ of the second high-frequency signal $S_{HF2}$ (or a whole numbered multiple thereof) and, thus, serves the function of first highpass filter 131. The other outer conductive trace has a length of at least one fourth the wavelength $\lambda_1$ of the first high-frequency signal $S_{HF1}$ (or again a whole numbered multiple thereof); thus, the second outer conductive trace serves the function of first lowpass filter 132. The high-frequency signals $S_{HF1}$, $S_{HF2}$ received from the first receiving antenna 121 are fed via the middle conductive trace. The resulting conductive trace structure can be implemented, for example, on that printed circuit board, on which also the additional components 131-139 of the evaluation circuit 13 are mounted.

The embodiment shown in FIG. 3 includes in the transmitting circuit 11 a transmitting amplifier 112 located between the harmonic wave oscillatory circuit 111" and the first transmitting antenna 113. Also, in the receiving circuit 12, a receiving amplifier 122 is arranged after the first receiving antenna 122. Thus, the transmitting- and receiving behavior can be individually matched to the particular container 2, or to the particular application. The transmitting amplifier 112 and the receiving amplifier 122 are not shown in the case of the embodiment of FIG. 2, but they can be implemented there as well.

The invention claimed is:

1. A measuring device for measuring a dielectric constant of a fill substance in a container, comprising:
    a transmitting circuit designed to transmit in the direction of the fill substance a first electromagnetic high-frequency signal having a first frequency and a second electromagnetic high-frequency signal having a second frequency;
    a receiving circuit arranged and embodied to receive the first high-frequency signal and the second high-frequency signal; and
    an evaluation circuit configured:
        to ascertain a first phase shift between the transmitted first high-frequency signal and the received first high-frequency signal;
        to ascertain a second phase shift between the transmitted second high-frequency signal and the received second high-frequency signal;
        to ascertain an amplitude of the received first high-frequency signal; and
        based on the amplitude, the first phase shift, and the second phase shift, to determine the dielectric constant, wherein the evaluation circuit is configured to determine the dielectric constant of the fill substance according to the following formula:

$$\frac{\left(\frac{c_0 * \Delta\varphi_1}{2\pi f_{HF1}}\right)^2 - 1}{DK - 1} = (1 - r) = \frac{\left(\frac{c_0 * \Delta\varphi_2}{2\pi f_{HF2}}\right)^2 - 1}{DK - 1}$$

wherein $c_0$ is a propagation velocity of electromagnetic waves in a vacuum, $\Delta\varphi_1$ is the first phase shift, $f_{HF1}$ is the first frequency, DK is the dielectric constant, r is a fraction of air/moisture in the fill substance, $\Delta\varphi_2$ is the second phase shift, and $f_{HF2}$ is the second frequency.

2. The measuring device as claimed in claim 1, wherein the transmitting circuit is so designed that the first frequency and the second frequency lie between 10 MHz and 10 GHz.

3. The measuring device as claimed in claim 1, wherein the evaluation circuit is further configured to ascertain an amplitude of the first high-frequency signal and the second high-frequency signal.

4. The measuring device as claimed in claim 1, wherein the transmitting circuit includes a first oscillatory circuit designed to produce the first high-frequency signal and/or the second high-frequency signal.

5. The measuring device as claimed in claim 4, wherein the first oscillatory circuit is designed to simultaneously produce the first high-frequency signal and the second high-frequency signal.

6. The measuring device as claimed in claim 4, wherein the first oscillatory circuit is designed to produce the second high-frequency signal with a first harmonic of the first high-frequency signal.

7. The measuring device as claimed in claim 4, wherein the transmitting circuit further includes a second oscillatory circuit for producing the second high-frequency signal.

8. The measuring device as claimed in claim 1, wherein the transmitting circuit includes a first transmitting antenna for transmitting the first high-frequency signal and the second high-frequency signal.

9. The measuring device as claimed in claim 1, wherein the transmitting circuit includes a first transmitting antenna for transmitting the first high-frequency signal and further includes a second transmitting antenna for transmitting the second high-frequency signal.

10. The measuring device as claimed in claim 1, wherein the receiving circuit includes a first receiving antenna for receiving the first high-frequency signal and the second high-frequency signal.

11. The measuring device as claimed in claim 1, wherein the receiving circuit includes a first receiving antenna for receiving the first high-frequency signal and further includes a second receiving antenna for receiving the second high-frequency signal.

12. The measuring device as claimed in claim 8, wherein the first transmitting antenna is designed as a rod antenna, a horn antenna, or a planar antenna.

13. The measuring device as claimed in claim 9, wherein the first transmitting antenna and the second transmitting antenna are designed as rod antennas, horn antennas, or planar antennas.

14. The measuring device as claimed in claim 10, wherein the first receiving antenna is designed as a rod antenna, a horn antenna, or a planar antenna.

15. The measuring device as claimed in claim 11, wherein the first receiving antenna and the second receiving antenna are designed as rod antennas, horn antennas, or planar antennas.

16. The measuring device as claimed in claim 1, wherein the transmitting circuit is designed to transmit the first high-frequency signal and/or the second high-frequency signal with amplitude modulation, and wherein the receiving circuit is embodied to detect the amplitude modulation and to associate the detected amplitude modulation with the corresponding high-frequency signal.

17. The measuring device as claimed in claim 1,
wherein the first frequency and the second frequency are related by a ratio of two to one,
wherein the evaluation circuit is configured to determine the dielectric constant of the fill substance according to the following formula:

$$\frac{r*\Delta\varphi_2^2}{4*\Delta\varphi_1^2} - \frac{r}{\left(\frac{c_0*\Delta\varphi_1}{2\pi f}\right)^2} = \frac{(A-1)*DK*k}{DK*k-1}$$

wherein k is a constant dependent on the distance between the transmitting circuit and the receiving circuit as well as on absorption of the fill substance, f is the first frequency, and A is the amplitude of the received first high-frequency signal.

18. A method for the determining a dielectric constant of a fill substance in a container, comprising:
transmitting a first electromagnetic high-frequency signal having a first frequency in the direction of the fill substance;
transmitting a second electromagnetic high-frequency signal having a second frequency in the direction of the fill substance;
receiving the first high-frequency signal after the first high-frequency signal has passed through the fill substance;
receiving the second high-frequency signal after the second high-frequency signal has passed through the fill substance;
ascertaining a first phase shift between the transmitted first high-frequency signal and the received first high-frequency signal;
ascertaining a second phase shift between the transmitted second high-frequency signal and the received second high-frequency signal;
ascertaining an amplitude of the received first high-frequency signal; and
determining the dielectric constant based on the amplitude, the first phase shift, and the second phase shift,
wherein the dielectric constant is determined according to the following formula:

$$\frac{\left(\frac{c_0*\Delta\varphi_1}{2\pi f_{HF1}}\right)^2 - 1}{DK-1} = (1-r) = \frac{\left(\frac{c_0*\Delta\varphi_2}{2\pi f_{HF2}}\right)^2 - 1}{DK-1}$$

wherein $c_0$ is a propagation velocity of electromagnetic waves in a vacuum, $\Delta\varphi_1$ is the first phase shift, $f_{HF1}$ is the first frequency, DK is the dielectric constant, r is a fraction of air/moisture in the fill substance, $\Delta\varphi_2$ is the second phase shift, and $f_{HF2}$ is the second frequency.

* * * * *